US011447581B2

(12) United States Patent
Seo et al.

(10) Patent No.: US 11,447,581 B2
(45) Date of Patent: Sep. 20, 2022

(54) METHOD FOR SELECTIVE HYDROGENATION

(71) Applicant: Hanwha Solutions Corporation, Seoul (KR)

(72) Inventors: Sang Ho Seo, Daejeon (KR); Ji Hye Choi, Suwon-si (KR); Kee Do Han, Daejeon (KR); Seong Ho Park, Daejeon (KR); Bong Sik Jeon, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 228 days.

(21) Appl. No.: 16/769,709

(22) PCT Filed: Dec. 19, 2018

(86) PCT No.: PCT/KR2018/016245
§ 371 (c)(1),
(2) Date: Jun. 4, 2020

(87) PCT Pub. No.: WO2019/132398
PCT Pub. Date: Jul. 4, 2019

(65) Prior Publication Data

US 2020/0369794 A1 Nov. 26, 2020

(30) Foreign Application Priority Data

Dec. 29, 2017 (KR) ........................ 10-2017-0184762

(51) Int. Cl.

| | |
|---|---|
| ***C08F 8/04*** | (2006.01) |
| ***C10G 45/60*** | (2006.01) |
| ***B01J 21/08*** | (2006.01) |
| ***B01J 23/755*** | (2006.01) |
| ***B01J 35/10*** | (2006.01) |
| ***B01J 37/03*** | (2006.01) |
| ***B01J 37/04*** | (2006.01) |
| ***C08F 240/00*** | (2006.01) |
| ***C09J 157/02*** | (2006.01) |

(52) U.S. Cl.
CPC ................. *C08F 8/04* (2013.01); *B01J 21/08* (2013.01); *B01J 23/755* (2013.01); *B01J 35/1019* (2013.01); *B01J 35/1061* (2013.01); *B01J 37/031* (2013.01); *B01J 37/04* (2013.01); *C08F 240/00* (2013.01); *C09J 157/02* (2013.01); *C10G 45/60* (2013.01)

(58) Field of Classification Search
CPC ........................................................ C08F 8/04
See application file for complete search history.

(56) References Cited

U.S. PATENT DOCUMENTS

| | | | |
|---|---|---|---|
| 2,227,672 A | 1/1941 | Pier et al. | |
| 4,328,090 A | 5/1982 | Stuckey, Jr. et al. | |
| 4,501,857 A | 2/1985 | Kishimoto et al. | |
| 6,433,104 B1 * | 8/2002 | Macedo .................... | C08F 8/04 525/327.9 |
| 7,038,097 B2 | 5/2006 | Molinier et al. | |
| 2005/0228143 A1 | 10/2005 | Yamakawa et al. | |
| 2007/0225531 A1 | 9/2007 | Ryu | |
| 2008/0139383 A1 | 6/2008 | Ryu | |
| 2010/0285950 A1 | 11/2010 | Le Van Mao | |
| 2012/0080357 A1 | 4/2012 | Novak et al. | |
| 2013/0341243 A1 | 12/2013 | Novak et al. | |
| 2016/0159941 A1 | 6/2016 | Sandee et al. | |

FOREIGN PATENT DOCUMENTS

| | | |
|---|---|---|
| CN | 1662301 | 8/2005 |
| CN | 102382259 | 3/2012 |
| CN | 103228355 | 7/2013 |
| CN | 103724544 | 4/2014 |
| CN | 106832127 | 6/2017 |
| CN | 107433201 | 12/2017 |
| JP | 06-001726 | 1/1994 |
| JP | 1997-202810 | 8/1997 |
| JP | 3687079 | 10/1997 |
| JP | 2004-016946 | 1/2004 |
| JP | 2008-512241 | 4/2008 |
| JP | 2009-531426 | 9/2009 |
| KR | 10-2005-0010940 | 1/2005 |
| KR | 10-2008-0108140 | 12/2008 |
| KR | 10-2013-0124316 | 11/2013 |
| KR | 10-2015-0031700 | 3/2015 |
| KR | 10-2016-0040177 | 4/2016 |
| WO | 2010-033487 | 3/2010 |

OTHER PUBLICATIONS

EPO, Search Report of EP 18897190.7 dated Aug. 4, 2021.
KIPO, PCT Search Report & Written Opinion of PCT/KR2018/016245 dated Apr. 10, 2019.
Laura Beth Dong et al., "Hydrogenation of polystyrene in CO2-expanded liquids: The effect of catalyst composition on deactivation", Applied Catalysis A: General, 2010, vol. 384, No. 1-2, pp. 45-50.
A. L. Tarasov et al., "Selective hydrogenation of 1,3❑pentadiene over mono❑ and bimetallic sulfidized Ni(Cu)—S/SiO2 catalysts", Russian Chemical Bulletin, 2016, vol. 65, No. 12, pp. 2841-2844.

* cited by examiner

*Primary Examiner* — Renee Robinson
(74) *Attorney, Agent, or Firm* — Lex IP Meister, PLLC

(57) ABSTRACT

The invention relates to a method for selective hydrogenation. More specifically, it relates to a method for selective hydrogenation capable of improving selectivity and reaction efficiency in the hydrogenation process of petroleum resin.

9 Claims, No Drawings

METHOD FOR SELECTIVE HYDROGENATION

CROSS-REFERENCE TO RELATED APPLICATION(S)

This application claims the benefit of Korean Patent Application No. 10-2017-0184762 filed on Dec. 29, 2017 with the Korean Intellectual Property Office, the disclosures of which are herein incorporated by reference in their entirety.

BACKGROUND OF THE INVENTION

(a) Field of the Invention

The invention relates to a method for selective hydrogenation. More specifically, it relates to a method for selective hydrogenation capable of improving selectivity and reaction efficiency in the hydrogenation process of petroleum resin.

(b) Description of the Related Art

In general, a hydrogenation process for organic compounds is a reaction applied to reduce a specific functional group, or converting an unsaturated compound into a saturated compound, and it may be applied for various compounds to reduce compounds having unsaturated functional groups such as ketone, aldehyde, imine, and the like into a compound such as alcohol, amine, and the like, or to saturate the unsaturated bond of an olefinic compound.

Lower olefins (namely, ethylene, propylene, butylenes and butadiene) and aromatic compounds (namely, benzene, toluene, xylene) are basic intermediate materials widely used in petrochemical and chemical industries. Thermal cracking or thermal decomposition of steam is the main type of processes for the formation of these materials in the presence of steam, and in the absence of oxygen. Raw materials may include petroleum gas and distillate such as naphtha, kerosene and gas oil. Wherein, by the thermal decomposition of naphtha, and the like, C4 fraction including ethylene, propylene, butane and butadiene, cracked gasoline (including benzene, toluene and xylene), cracked kerosene (fraction of C9 or more), cracked heavy oil (ethylene bottom oil) and hydrogen gas may be produced, and petroleum resin may be prepared by the polymerization from the fractions.

However, petroleum resin partially comprises unsaturated bonds, and thus, the quality may be lowered. Wherein, if a hydrogenation process of adding hydrogen is conducted, the unsaturated bonds may be saturated, color may brighten, and the odor unique to petroleum resin may be reduced, thereby improving qualities.

During the hydrogenation process of such petroleum resin, in order to control the content of aromatics, it is necessary to selectively hydrogenate olefinic bonds of the resin.

The selective hydrogenation of the olefinic bonds may be generally conducted by contacting a reaction subject with a noble metal catalyst such as palladium (Pd), platinum (Pt), and the like, but the noble metal catalyst is very expensive and causes cost increase. However, in case non-noble metal, for example, nickel based catalyst is used, aromatics may be hydrogenated together, and thus, it may be difficult to control the content of aromatics of petroleum resin.

SUMMARY OF THE INVENTION

It is an object of the invention to provide a method for selective hydrogenation that can conduct a hydrogenation process with high selectivity to olefinic bonds, and can easily maintain and replace hydrogenation catalysts, and thus, has high process efficiency.

According to one embodiment of the invention, there is provided a method for selective hydrogenation comprising the steps of:

dispersing two or more kinds of hydrogenation catalysts in a solvent to prepare a catalyst slurry; and mixing the catalyst slurry, a hydrogenation subject, and hydrogen gas to conduct a hydrogenation process.

According to the method for selective hydrogenation of the invention, for petroleum resin having both aromatic double bonds and olefinic double bonds, a hydrogenation process may be conducted with high selectivity to olefinic double bonds.

And, hydrogenation catalysts used for the hydrogenation process may be combined according to the aimed selectivity and APHA value of the final product, and thus, desired selectivity and APHA value may be easily achieved.

In addition, catalysts may be easily replaced even during a hydrogenation process, and catalytic activity may be constantly maintained, and thus, the efficiency of hydrogenation process may be further improved.

DETAILED DESCRIPTION OF THE EMBODIMENTS

Although various modifications can be made to the present invention and the present invention may have various forms, specific examples will be illustrated and explained in detail below. However, it should be understood that these are not intended to limit the present invention to specific disclosure, and that the present invention includes all the modifications, equivalents or replacements thereof without departing from the spirit and technical scope of the invention.

And, the terms used herein are only to explain specific embodiments, and are not intended to limit the present invention. A singular expression includes a plural expression thereof, unless it is expressly stated or obvious from the context that such is not intended. As used herein, the terms "comprise" or "have", etc. are intended to designate the existence of practiced characteristic, number, step, constructional element or combinations thereof, and they are not intended to preclude the possibility of existence or addition of one or more other characteristics, numbers, steps, constructional elements or combinations thereof.

And, in case it is mentioned that each constructional element is formed "on" or "above" each constructional element, it means that each constructional element is directly formed on each constructional element, or that other constructional elements may be additionally formed between each layer or on a subject or substrate.

Hereinafter, a method for selective hydrogenation of the invention will be explained in more detail.

The method for selective hydrogenation according to one embodiment comprises the steps of: dispersing two or more kinds of hydrogenation catalysts in a solvent to prepare a catalyst slurry; and mixing the catalyst slurry, a hydrogenation subject, and hydrogen gas to conduct a hydrogenation process.

The method for selective hydrogenation may be applied for various hydrogenation processes in which unsaturated functional groups such as ketone, aldehyde, imine, and the like are reduced, or unsaturated bonds such as carbon-carbon double bonds or triple bonds existing on olefinic compounds, aromatic compounds, petroleum resin, and other organic compounds are saturated, but preferably, it may be applied for a subject that comprises two or more unsaturated bonds in one molecule and requires selective hydrogenation for the two or more unsaturated bonds. Particularly, it may be usefully applied for a subject having both olefinic unsaturated bond and aromatic unsaturated bond, and requiring selective hydrogenation for any one bond.

For example, according to one embodiment of the invention, the method for selective hydrogenation may be applied for petroleum resin comprising both olefinic 100 unsaturated bonds and aromatic unsaturated bonds.

In order to prepare petroleum resin comprising aromatic functional groups, a technology of controlling aromaticity and color value of the final product through selective hydrogenation is very important. Namely, in order to prepare high quality petroleum resin, it is necessary to conduct selective hydrogenation only for olefinic 105 double bonds rather than double bonds of aromatic moieties. And, in order to achieve aromaticity of an aimed level, it is also necessary to differently control the selectivity.

Higher the selectivity to olefinic bonds, higher the aromaticity of petroleum resin, and the aromaticity may be measured by NMR.

Although an APHA value showing the color property of petroleum resin is not 110 necessarily proportional hereto, in general, it becomes low as the selectivity to olefinic bonds is higher, and the APHA value may be measured according to ASTM D1209. As the APHA value is lower, the resin becomes water white resin in which color and odor almost disappear, wherein the residual olefin content (NMR, % area) may be less than 0.1%.

Meanwhile, the type of reactor commercially widely used for a hydrogenation process is a fixed bed reactor, and the fixed bed reactor has an advantage in terms of low investment cost and operating cost. The fixed bed reactor conducts a hydrogenation process while penetrating liquid raw material together with water from the upper part to the lower part or from the lower part to the upper part in the reactor comprising a bed filled with a hydrogenation catalyst. The catalyst bed of the fixed bed reactor is filled with a catalyst in an amount sufficient for use for a long time such as several months or more than one year.

However, as a hydrogenation process progresses, the activity of a hydrogenation catalyst gradually decreases. The decrease in catalytic activity is caused by various physical and chemical influences, for example, by block or loss of catalytically active regions due to thermal, mechanical or chemical treatment. And, at the beginning of the process, reaction rapidly progresses by raw materials of high concentration, and thus, reaction heat may be partially accumulated to generate hot spot. As sintering is generated by such hot spot, decrease in catalytic activity is further accelerated. Such decrease in catalytic activity induces decrease in overall reactivity and causes decrease in overall hydrogenation degree, selectivity and purity of the hydrogenation product, and thus, if catalytic activity is decreased below a certain level, the filled catalyst should be replaced.

Wherein, since the catalyst cannot be replaced during the reaction in the fixed bed reactor, the catalyst should be replaced after completely stopping the reaction, thus involving heavy losses in industrial scale. And, it is fundamentally impossible to change the kind of catalyst during the reaction so as to control the selectivity of hydrogenation process.

The invention is aimed to solve the above complicated problems, and is based on the discovery that by using two or more kinds of hydrogenation catalysts in combination so as to facilitate the control of aromaticity and APHA value, and preparing such two or more kinds of hydrogenation catalysts in the form of slurry instead of a fixed bed and conducting a hydrogenation process, catalysts may be easily replaced and added to maintain the activity of hydrogenation catalysts, and the selectivity of hydrogenation process may be easily controlled according to the combination of hydrogenation catalysts.

In the method for selective hydrogenation of the invention, two or more kinds of hydrogenation catalysts are first dissolved in a solvent to prepare a catalyst slurry.

Previously, in most hydrogenation processes, only one kind of a hydrogenation catalyst was used to progress hydrogenation. As such, if one kind of a hydrogenation catalyst is used, the selectivity of a hydrogenation process is fixed according to corresponding catalyst, and it is almost impossible to change the selectivity of corresponding hydrogenation process during the process.

Thus, two or more kinds of hydrogenation catalysts having different properties are used, and they are not fixed to a bed but dissolved in a solvent and made in the form of slurry, and a hydrogenation process is progressed.

The two or more kinds of hydrogenation catalysts may be hydrogenation catalysts having different hydrogenation selectivity. And, the two or more kinds of hydrogenation catalysts may be supported catalysts that are respectively supported on different carriers so as to facilitate replacement and mixing.

For example, according to one embodiment, the two or more kinds of hydrogenation catalysts may be a mixture of a non-selective hydrogenation catalyst having relatively low selectivity to olefinic unsaturated bonds and aromatic unsaturated bonds, and a selective hydrogenation catalyst having relatively high selectivity to olefinic bonds.

The non-selective hydrogenation catalyst and selective hydrogenation catalyst are not classified according to an absolute standard, but relatively classified, and for example, in case two kinds of hydrogenation catalysts having different selectivity to olefinic bonds comprise a catalyst a and a catalyst b, and the catalyst a has higher selectivity to olefinic bonds than the catalyst b, the catalyst a may be classified as a selective hydrogenation catalyst, and the catalyst b may be classified as a non-selective hydrogenation catalyst. However, in case two kinds of hydrogenation catalysts comprise a catalyst a, and a catalyst c having higher selectivity to olefinic bonds than the catalyst a, the catalyst c may be classified as a selective hydrogenation catalyst, and the catalyst a may be classified as a non-selective hydrogenation catalyst.

And, the kind and mixing ratio of the non-selective hydrogenation catalyst and selective hydrogenation catalyst may be differently controlled according to the aimed selectivity, aromaticity, or APHA value of the hydrogenation subject.

Meanwhile, although the APHA value and aromaticity decrease over the hydrogenation process time, the degree and speed of decrease are not directly proportional thereto. Thus, according to one embodiment of the invention, by appropriately controlling the kind and mixing ratio of a non-selective hydrogenation catalyst and a selective hydrogenation catalyst, the speeds of decreases in APHA value and aromaticity may be respectively controlled, thus easily achieving APHA value and aromaticity of desired degrees.

According to one embodiment of the invention, the non-selective hydrogenation catalyst may include nickel (Ni) as active metal.

According to one embodiment of the invention, the selective hydrogenation catalyst may comprise noble metal such as palladium (Pd), platinum (Pt), ruthenium (Ru) or rhodium (Rh) as active metal.

And, each of the non-selective hydrogenation catalyst and selective hydrogenation catalyst may be independently supported on a carrier such as silica, alumina, magnesia or a mixture thereof, but the invention is not limited thereto.

According to one embodiment of the invention, the selective hydrogenation catalyst may be one in which sulfur(S) and copper (Cu) are supported as cocatalysts together with nickel (Ni) on a carrier.

In general, a nickel (Ni) catalyst has very low selectivity to olefinic bonds, and is known to be difficult to use for a hydrogenation process.

However, since the nickel catalyst according to one embodiment of the invention further comprises a sulfur(S) or copper (Cu) compound as a cocatalyst, it exhibits high selectivity to olefinic bonds, and may be used as a selective hydrogenation catalyst.

Throughout the specification, such a catalyst comprising sulfur and copper as cocatalyst together with nickel is distinguished from other nickel catalysts, for example, distinguished from the catalysts that comprise only nickel as active metal and do not comprise a cocatalyst, or catalysts that comprise nickel as active metal and comprise a cocatalyst or a compound other than sulfur and copper, and is referred to as a "nickel based selective hydrogenation catalyst".

The nickel based selective hydrogenation catalyst according to one embodiment of the invention comprises nickel as a metal exhibiting catalytic activity, comprises sulfur and copper as cocatalysts, and the nickel and cocatalysts are supported together on a carrier. And, the carrier may be one or more selected from porous silica ($SiO_2$) and alumina ($Al_2O_3$).

Since the nickel based selective hydrogenation catalyst comprises sulfur and copper as cocatalysts, although it uses nickel, it significantly decreases the speed of hydrogenation to aromatic unsaturated bonds while maintaining the speed of hydrogenation to olefinic unsaturated bonds during the hydrogenation process of petroleum resin, thus enabling selective hydrogenation to olefinic unsaturated bonds.

In the nickel based selective hydrogenation catalyst, the average crystal size of nickel may be 1 to 10 nm, preferably 3 to 7 nm. If the average crystal size of nickel does not fall within the above range, catalytic activity may be lowered.

And, the average particle size of the nickel based selective hydrogenation catalyst may be 1 to 20 μm, preferably 3 to 10 μm. If the average particle size of the catalyst is too small, filterability of the catalyst may be insufficient, and if it is too large, catalytic activity may be lowered.

The nickel based selective hydrogenation catalyst may comprise nickel in an amount of about 40 to about 80 parts by weight, preferably about 50 to about 70 parts by weight, based on 100 parts by weight of total precursor comprising nickel and cocatalysts. If the content of nickel is less than 40 parts by weight, catalytic activity may be lowered, and if it is greater than 80 parts by weight, dispersability may be lowered, and thus, catalytic activity may be lowered.

And, sulfur and copper may be each independently included in an amount of about 0.05 to about 10 parts by weight, preferably about 0.1 to about 5 parts by weight, based on 100 parts by weight of the total precursor comprising nickel and cocatalyst. If the content of sulfur or copper is less than 0.05 parts by weight, selective catalytic activity may be lowered, and if it is greater than 10 parts by weight, dispersability may be lowered, and thus, selective catalytic activity may be lowered.

And, the mole ratio of the carrier:nickel may be 1:0.1 to 10.0. If the content of nickel is less than the above range, catalytic activity may be lowered, and if it is greater than the above range, dispersability may be lowered, and thus, catalytic activity may be lowered.

And, the mole ratio of the nickel:cocatalysts may be 1:0.03 to 0.5. If the content of cocatalysts is less than the above range, selective catalytic activity may be lowered, and if it is greater than the above range, dispersability may be lowered, and thus, selective catalytic activity may be lowered.

According to one embodiment of the invention, the nickel based selective hydrogenation catalyst may be prepared by mixing a nickel compound and cocatalysts in a solvent to prepare a precursor solution, and suspending a carrier in the precursor solution to precipitate nickel and cocatalysts in the carrier.

More specifically explaining the preparation method of the nickel based selective hydrogenation catalyst, first, porous silica powder, a nickel precursor and a copper precursor are dissolved in distilled water to prepare a precursor solution. Wherein, the nickel precursor may comprise nickel, or a metal salt such as nitrate, acetate, sulfate, chloride of nickel, and the like, and most preferably, nickel chloride may be used. And, as the copper precursor, one kind or a mixture of two more kinds selected from copper nitrate, acetate, sulfate, chloride and hydroxide may be used, While putting the precursor solution in a precipitation vessel and stirring, a temperature is raised to 50 to 120° C. And then, in the temperature-raised precursor solution, a solution comprising a pH controlling agent and a sulfur precursor is introduced for 30 minutes to 2 hours to precipitate, thus forming a supported catalyst in which nickel and cocatalysts supported. As the sulfur precursor, one kind or a mixture of two or more kinds selected from copper nitrate, acetate, sulfate, chloride and hydroxide may be used.

The supported catalyst is washed and filtered, and then, dried at 100 to 200° C. for 5 to 24 hours. And, a step of reducing the dried catalyst under a hydrogen atmosphere at a temperature of 200 to 500° C., preferably 300 to 450° C. to activate may be further included, and the activated supported catalyst may be made into a powder catalyst by immobilization with nitrogen mixed gas containing 0.1 to 20% of oxygen.

However, the above preparation method is no more than one example, and the invention is not limited thereby.

The nickel based selective hydrogenation catalyst may be in the form of powders, particles, granules, preferably powders.

When the above prepared nickel based selective hydrogenation catalyst is used alone as a hydrogenation catalyst for petroleum resin, aromaticity of the reaction product may be comparable to noble catalysts, and high selectivity may be exhibited.

According to one embodiment of the invention, as the hydrogenation catalysts, one or more kinds of non-selective hydrogenation catalysts, and one or more kinds of selective hydrogenation catalysts may be used in combination.

And, in case one or more kinds of non-selective hydrogenation catalysts, and one or more kinds of selective hydrogenation catalysts are used in combination as the hydrogenation catalysts, the weight ratio of the non-selective hydrogenation catalyst and selective hydrogenation catalyst may vary according to the aimed aromaticity of the product and is not specifically limited, but for example, the weight ratio may be 1:0.01 to 1:100, or 1:1 to 1:50.

According to another embodiment of the invention, as the hydrogenation catalysts, two or more kinds of selective hydrogenation catalysts having different aromaticity may be used in combination.

Wherein, as the selective hydrogenation catalyst, the above explained nickel based selective hydrogenation catalyst or a selective hydrogenation catalyst including noble metal may be used.

As explained, two or more kinds of hydrogenation catalysts having different selectivity to olefinic bonds are prepared and dispersed in a solvent to prepare a catalyst slurry.

As the solvent that can be used, hydrocarbon solvents such as pentane, hexane, heptanes, nonane, decane, cyclohexane, methylcyclohexane, benzene, toluene, or xylene, and the like may be used, but not limited thereto.

As a method for dispersing the hydrogenation catalysts in a solvent, a method of stirring in a separate catalyst mixing device and dispersing before introducing into a hydrogenation reactor may be mentioned, but the method is not limited thereto, and any method can be used without limitations as long as it can uniformly disperse hydrogenation catalysts in a solvent.

The catalyst slurry thus prepared is introduced into a hydrogenation reactor, and into the hydrogenation reactor, a hydrogenation subject and hydrogen gas are introduced through a separate pipe, thus progressing a hydrogenation process. Wherein, the introduction of the catalyst slurry into the hydrogenation reactor may be one time, periodic, non-periodic or continuous, and any method may be adopted without limitations.

According to one embodiment of the invention, the catalysts may be introduced in an amount (based on the weight of catalysts included in the catalyst slurry) of about 0.1 to about 10 parts by weight, preferably about 0.1 to about 5 parts by weight, based on 100 parts by weight of the hydrogenation subject. If the introduction amount of the catalyst slurry is too small, catalytic activity may not be properly exhibited, and if it is too large, productivity may be lowered compared to the introduction amount, and thus, it may be preferable that the catalyst slurry is introduced in the above range.

And, the temperature of the hydrogenation process may be about 100 to about 400° C., preferably about 150 to about 300° C., and the pressure may be about 1 to about 200 bar, preferably about 30 to about 150 bar. And, the hydrogenation process may be conducted in various reactors, but preferably, an autoclave type reactor equipped with a stirrer or a loop type reactor that mixes reaction liquid while circulating may be used according to the mixing method.

The hydrogenation subject is a subject requiring selective hydrogenation, and for example, it may be petroleum resin consisting of C5 or C9 petroleum fraction, and by-products and combinations thereof through pretreatment and polymerization.

When catalytic activity is lowered as a hydrogenation process progresses, or when catalysts need to be replaced or added so as to control the aromaticity of the product, slurry type catalysts to be introduced may be changed without needing to stop the process, and thus, a continuous reaction is enabled, and catalytic activity may be constantly maintained, thereby significantly improving the efficiency of a hydrogenation process.

According to the method for selective hydrogenation as explained above, the APHA value and aromaticity of the hydrogenation product may be controlled in a wide range.

For example, the hydrogenation product may have APHA value measured according to ASTM D1209 of 150 or less, or 140 or less, or 130 or less, but not limited thereto. And, it is more preferable that the APHA value is lower, and thus, the lower limit is not specifically limited, but for example, it may be 5 or more, or 10 or more, or 20 or more, or 25 or more.

And, the hydrogenation product may have aromaticity measured by NMR analysis of 0.1% or more, or 0.5% or more, or 1% or more, or 5% or more, and 30% or less, or 25% or less, or 15% or less, or 10% or less, but not limited thereto.

However, the invention is not limited hereto, and the kind and weight ratio of hydrogenation catalysts may be changed to easily achieve aimed AHPA value and aromaticity in any range, and for this, hydrogenation catalysts may be freely changed at any time during the hydrogenation process.

Meanwhile, according to one embodiment of the invention, petroleum resin hydrogenated using the two or more kinds of hydrogenation catalysts may be used for a pressure sensitive adhesive and/or adhesive. For this purpose, the APHA value measured according to ASTM D1209 may be controlled to 150 or less, for example 5 to 150, and aromaticity measured by NMR analysis may be controlled to 30% or less, for example 0.1 to 30%, or 5 to 15%.

Hereinafter, the invention will be explained in more detail through examples and comparative examples, but they are presented for better understanding of the invention, and the scope of the invention is not limited thereby.

EXAMPLE

Preparation Example of Hydrogenation Catalysts

Preparation Example 1: Non-Selective Hydrogenation Catalyst (A)

50 ml of a solution in which 1 g of porous silica powders having a surface area of 200 $m^2/g$ and a pore size of 28 nm, nickel chloride (243 WI nickel) and copper chloride (2.2 WI copper) are dissolved in distilled water was introduced in a precipitation vessel, and a temperature was raised to 80° C. while stirring. After reaching 80° C., 40 ml of a solution containing sodium carbonate (175 g/l) was completely introduced within 1 hour using a syringe pump. After precipitation was completed, the pH of the slurry was 7.8, and it was washed with 1.5 L of distilled water and filtered, and then, dried using a drying oven at 120° C. for more than 12 hours. It was subdivided, and then, reduced under a hydrogen atmosphere at 400° C. to activate. The activated catalyst was fixed using nitrogen mixed gas containing 1% oxygen to prepare a hydrogenation catalyst.

In the fixed catalyst, the content of nickel was 63.2 wt %, and the content of copper was 0.89 wt %, based on the total weight of the catalyst, and the average size of nickel crystals was measured to be 5.7 nm.

Preparation Example 2: Non-Selective Hydrogenation Catalyst (B)

A nickel catalyst Ni-5338P, commercially available from BASF Corporation, was prepared.

Preparation Example 3: Nickel Based Selective Hydrogenation Catalyst (C)

50 ml of a solution in which 1 g of porous silica powders having a surface area of 200 $m^2/g$ and a pore size of 28 nm, nickel chloride (243 g/l nickel) and copper chloride (2.2 g/l copper) are dissolved in distilled water was introduced in a precipitation vessel, and a temperature was raised to 80° C. while stirring. After reaching 80° C., 40 ml of a solution containing sodium carbonate (175 g/l) sodium sulfide (15 g/l) was completely introduced within 1 hour using a syringe pump so that the mole ratio of sulfur/nickel became 0.09. After precipitation was completed, the pH of the slurry was 7.7, and it was washed with 1.5 L of distilled water and filtered, and then, dried using a drying oven at 120° C. for more than 12 hours. It was subdivided, and then, reduced under a hydrogen atmosphere at 400° C. to activate. The activated catalyst was fixed using nitrogen mixed gas containing 1% oxygen to prepare a nickel based selective hydrogenation catalyst.

In the fixed catalyst, the content of nickel was 63.8 wt %, the content of copper was 0.87 wt %, and the content of sulfur was 2.8 wt %, based on the total weight of the catalyst, and the average size of nickel crystals was measured to be 5.1 nm.

Hydrogenation Example

A hydrogenation process was conducted using the catalysts prepared in Preparation Examples 1 to 3, as follows.

Example 1

The non-selective hydrogenation catalyst (A) of Preparation Example 1 and the nickel based selective hydrogenation catalyst (C) of Preparation Example 3 were mixed at a weight ratio of 1:19, based on the weight of each catalyst, and the mixture was mixed with reaction raw materials.

Into a slurry reactor in which non-hydrogenated petroleum resin (DCPD polymerized petroleum resin) and solvent Exxsol D40 are mixed at a weight ratio of 6:4 and flow, the powder catalysts were introduced in an amount of 2 wt % (on the basis of catalyst weight), based on the weight of petroleum resin, and while supplying hydrogen gas so as to maintain reaction pressure at 90 bar, a hydrogenation process was conducted at a temperature of 230° C. for 1 hour.

Example 2

A hydrogenation process was conducted by the same method as Example 1, except that the non-selective hydrogenation catalyst (B) of Preparation Example 2 and the nickel based selective hydrogenation catalyst (C) of Preparation Example 3 were mixed at a weight ratio of 1:19, on the basis of the metal content included in each catalyst.

Example 3

A hydrogenation process was conducted by the same method as Example 1, except that the non-selective hydrogenation catalyst (A) of Preparation Example 1 and the nickel based selective hydrogenation catalyst (C) of Preparation Example 3 were mixed at a weight ratio of 1:7, on the basis of the metal content included in each catalyst.

Example 4

A hydrogenation process was conducted by the same method as Example 1, except that the non-selective hydrogenation catalyst (A) of Preparation Example 1 and the nickel based selective hydrogenation catalyst (C) of Preparation Example 3 were mixed at a weight ratio of 1:4, on the basis of the metal content included in each catalyst.

Comparative Example 1

A hydrogenation process was conducted by the same method as Example 1, except that only the non-selective hydrogenation catalyst (A) of Preparation Example 1 was dispersed to prepare a slurry catalyst.

Comparative Example 2

A hydrogenation process was conducted by the same method as Example 1, except that only the non-selective hydrogenation catalyst (B) of Preparation Example 2 was dispersed to prepare a slurry catalyst.

Comparative Example 3

A hydrogenation process was conducted by the same method as Example 1, except that only the nickel based selective hydrogenation catalyst (C) of Preparation Example 3 was dispersed to prepare a slurry catalyst.

Experimental Example

For the hydrogenation processes of Examples and Comparative Examples, olefinic bond selectivity test was conducted as follows, and the results were shown in the following Table 1.

(1) Measurement of APHA Value

APHA values were measured according to ASTM D1209 for the reactants of hydrogenation processes of Examples and Comparative Examples.

The APHA value is proportional to olefin content in petroleum resin, and more the olefinic bonds, higher the APHA value, and the APHA value of petroleum resin before the hydrogenation process was 1,500.

(2) Measurement of Aromaticity (%)

Aromaticity (%) was measured by NMR analysis for the reactants of hydrogenation processes of Examples and Comparative Examples.

TABLE 1

| | Kind and weight ratio of hydrogenation catalysts | APHA value | Aromaticity (%) |
|---|---|---|---|
| Example 1 | (A):(C) = 1:19 | 25 | 7.5 |
| Example 2 | (B):(C) = 1:19 | 120 | 9.3 |
| Example 3 | (A):(C) = 1:7 | 40 | 4.3 |
| Example 4 | (A):(C) = 1:4 | 45 | 4.7 |
| Comparative Example 1 | (A) | 25 | 0.1 |
| Comparative Example 2 | (B) | 20 | 0.3 |
| Comparative Example 3 | (C) | 10 | 16.5 |

Referring to Table 1, it can be seen that APHA value and aromaticity of petroleum resin can be easily controlled in a wide range according to the kind and mixing ratio of hydrogen catalysts.

What is claimed is:

1. A method for selective hydrogenation comprising the steps of:

dispersing two or more kinds of hydrogenation catalysts in a solvent to prepare a catalyst slurry; and mixing the catalyst slurry, a hydrogenation subject, and hydrogen gas to conduct a hydrogenation process, wherein the hydrogenation subject is petroleum resin, wherein the hydrogenation catalysts comprise a selective hydrogenation catalyst and a non-selective hydrogenation catalyst, wherein the selective hydrogenation catalyst is one in which nickel and a cocatalyst are supported on a carrier, and the cocatalyst comprises sulfur and copper, and wherein the non-selective hydrogenation catalyst comprises nickel (Ni).

2. The method for selective hydrogenation according to claim 1, wherein a weight ratio of the non-selective hydrogenation catalyst and selective hydrogenation catalyst is 1:0.01 to 1:100.

3. The method for selective hydrogenation according to claim 1, further comprising an additional selective hydrogenation catalyst comprising one or more noble metals selected from the group consisting of palladium (Pd), platinum (Pt), ruthenium (Ru), and rhodium (Rh).

4. The method for selective hydrogenation according to claim 1, wherein the solvent includes one or more selected from the group consisting of pentane, hexane, heptane, nonane, decane, cyclohexane, methylcyclohexane, benzene, toluene and xylene.

5. The method for selective hydrogenation according to claim 1, wherein the hydrogenation process is conducted at a temperature of 100 to 400° C. and a pressure of 1 to 200 bar.

6. The method for selective hydrogenation according to claim 1, wherein the hydrogenation process is conducted in an autoclave type reactor equipped with a stirrer or a loop type reactor that mixes reaction fluid while circulating.

7. The method for selective hydrogenation according to claim 1, wherein a product obtained after conducting the hydrogenation process has an APHA value measured according to ASTM D1209 of 150 or less.

8. The method for selective hydrogenation according to claim 1, wherein a product obtained after conducting the hydrogenation process has aromaticity measured by NMR analysis of 30% or less.

9. The method for selective hydrogenation according to claim 1, wherein a product obtained after conducting the hydrogenation process is used for a pressure sensitive adhesive or an adhesive.

* * * * *